(12) United States Patent
Oto

(10) Patent No.: US 10,699,372 B2
(45) Date of Patent: Jun. 30, 2020

(54) IMAGE GENERATION APPARATUS AND IMAGE DISPLAY CONTROL APPARATUS

(71) Applicant: Sony Interactive Entertainment Inc., Tokyo (JP)

(72) Inventor: Tomohiro Oto, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/478,255

(22) PCT Filed: Oct. 16, 2017

(86) PCT No.: PCT/JP2017/037383
§ 371 (c)(1),
(2) Date: Jul. 16, 2019

(87) PCT Pub. No.: WO2018/135052
PCT Pub. Date: Jul. 26, 2018

(65) Prior Publication Data
US 2019/0355090 A1    Nov. 21, 2019

(30) Foreign Application Priority Data
Jan. 19, 2017   (WO) .................. PCT/JP2017/001752

(51) Int. Cl.
*G06T 3/00*     (2006.01)
*G06T 15/20*    (2011.01)

(52) U.S. Cl.
CPC .......... *G06T 3/0043* (2013.01); *G06T 15/205* (2013.01); *G06T 3/0062* (2013.01)

(58) Field of Classification Search
CPC ....... G06T 3/0043; G06T 3/00; G06T 3/0062; G06T 15/205
See application file for complete search history.

(56) References Cited

U.S. PATENT DOCUMENTS 8,284,992 B2   10/2012   Takamori
8,854,359 B2   10/2014   Takenaka
(Continued)

FOREIGN PATENT DOCUMENTS

JP   2004056335 A   2/2004
JP   2012095229 A   5/2012
(Continued)

OTHER PUBLICATIONS

International Search Report for corresponding PCT Application No. PCT/JP2017/037383, 1 page dated Dec. 19, 2017.
(Continued)

*Primary Examiner* — Nicholas R Wilson
(74) *Attorney, Agent, or Firm* — Matthew B. Dernier, Esq.

(57) ABSTRACT

Disclosed is an image generation apparatus generating and outputting a panoramic image that is obtained by converting, to a planar shape, a projection plane onto which a scene within at least a partial range of a virtual sphere as viewed from an observation point is projected. The panoramic image is such that a unit area on the virtual sphere containing a given attention direction as viewed from the observation point is converted to a broader area than other unit areas. The image generation apparatus generates the panoramic image corresponding to the projection plane such that a portion of a main line that links a position in the attention direction to a position in a direction opposite the attention direction and is within the panoramic image corresponding to a unit amount of an angle of rotation around the observation point is maximized in length at a position closest to the attention direction.

8 Claims, 7 Drawing Sheets

(56) References Cited

U.S. PATENT DOCUMENTS

| | | |
|---|---|---|
| 9,392,167 B2 | 7/2016 | Shohara |
| 2013/0057542 A1 | 3/2013 | Takenaka |
| 2014/0176542 A1 | 6/2014 | Shohara |
| 2014/0270693 A1 | 9/2014 | Suzuki |
| 2014/0282800 A1 | 9/2014 | Morita |
| 2014/0298394 A1 | 10/2014 | Kurihara |
| 2015/0078731 A1 | 3/2015 | Nishizaka |
| 2018/0007387 A1 | 1/2018 | Izumi |
| 2018/0115796 A1 | 4/2018 | Yang |
| 2018/0176650 A1 | 6/2018 | Hirabayashi |

FOREIGN PATENT DOCUMENTS

| | | | |
|---|---|---|---|
| JP | 2013057993 A | 3/2013 | |
| JP | 2014127001 A | 7/2014 | |
| JP | 2016167699 A | 9/2016 | |
| WO | 2016140083 A1 | 9/2016 | |
| WO | 2016199608 A1 | 12/2016 | |

OTHER PUBLICATIONS

International Search Report for related PCT Application No. PCT/JP2017/001753, 4 pages dated Apr. 25, 2017.

International Preliminary Report on Patentability and Written Opinion for corresponding PCT Application No. PCT/JP2017/001753, 5 pages dated Jul. 23, 2019.

International Preliminary Report on Patentability and Written Opinion for corresponding PCT Application No. PCT/JP2017/001752, 5 pages dated Jul. 23, 2019.

International Preliminary Report on Patentability and Written Opinion for corresponding PCT Application No. PCT/JP2017/037383, 5 pages dated Jul. 23, 2019.

Office Action for related U.S. Appl. No. 16/478,512, 14 pages, dated Apr. 30, 2020.

IMAGE GENERATION APPARATUS AND IMAGE DISPLAY CONTROL APPARATUS

TECHNICAL FIELD

The present invention relates to an image generation apparatus generating a panoramic image, an image display control apparatus displaying a panoramic image, an image generation method, a program, and image data.

BACKGROUND ART

A format such as an equirectangular projection format is known as an image format of a panoramic image that is obtained by projecting an omnidirectional scene viewed from an observation point onto to a two-dimensional plane. Using such a panoramic image makes it possible, for example, to implement a panorama viewer that displays a scene in a desired direction in accordance with a user's operation of the orientation of a viewpoint.

SUMMARY

Technical Problem

In a case where the above-mentioned image format is used to allow a user to view a panoramic image, a particular direction, such as the forward direction from the user or the direction of a point where a particular object is imaged, may become important. However, a conventional panoramic image format does not distinguish between such an importation direction and an unimportant direction.

The present invention has been made in view of the above circumstances. An object of the present invention is to provide image data that is related to a panoramic image and capable of displaying an important direction with higher resolution. Another object is to provide an image generation apparatus, an image display control apparatus, an image generation method, and a program that are compatible with the image data.

Solution to Problem

According to the present invention, there is provided an image generation apparatus including a panoramic image generation section and an image output section. The panoramic image generation section generates a panoramic image that is obtained by converting, to a planar shape, a projection plane onto which a scene within at least a partial range of a virtual sphere as viewed from an observation point is projected. In the panoramic image, a unit area on the virtual sphere containing a given attention direction as viewed from the observation point is converted to a broader area than other unit areas. The image output section outputs the generated panoramic image. The projection plane contains a main line that links a position in the attention direction to a position in a direction opposite the attention direction. The panoramic image generation section generates the panoramic image corresponding to the projection plane such that a length of a portion of the main line within the panoramic image corresponding to a unit amount of an angle of rotation around the observation point is maximized at a position closest to the attention direction.

According to the present invention, there is provided an image display control apparatus including an acquisition section and a drawing section. The acquisition section acquires a panoramic image that is obtained by converting, to a planar shape, a projection plane onto which a scene within at least a partial range of a virtual sphere as viewed from an observation point is projected. In the panoramic image, a unit area on the virtual sphere containing a given attention direction as viewed from the observation point is converted to a broader area than other unit areas. The drawing section draws a display image depicting a scene within a given visual field range in accordance with the acquired panoramic image, and displays the drawn display image on a screen of a display apparatus. The projection plane contains a main line that links a position in the attention direction to a position in a direction opposite the attention direction. The panoramic image is obtained by converting the projection plane such that a length of a portion of the main line within the panoramic image corresponding to a unit amount of an angle of rotation around the observation point is maximized at a position closest to the attention direction.

According to the present invention, there is provided an image generation method a step of generating a panoramic image and a step of outputting the generated panoramic image. The step of generating a panoramic image generates a panoramic image that is obtained by converting, to a planar shape, a projection plane onto which a scene within at least a partial range of a virtual sphere as viewed from an observation point is projected. In the panoramic image, a unit area on the virtual sphere containing a given attention direction as viewed from the observation point is converted to a broader area than other unit areas. The step of outputting the panoramic image outputs the generated panoramic image. The projection plane contains a main line that links a position in the attention direction to a position in a direction opposite the attention direction. The step of generating a panoramic image generates the panoramic image corresponding to the projection plane such that a length of a portion of the main line within the panoramic image corresponding to a unit amount of an angle of rotation around the observation point is maximized at a position closest to the attention direction.

According to the present invention, there is provided a program for causing a computer to function as a panoramic image generation section and an image output section. The panoramic image generation section generates a panoramic image that is obtained by converting, to a planar shape, a projection plane onto which a scene within at least a partial range of a virtual sphere as viewed from an observation point is projected. In the panoramic image, a unit area on the virtual sphere containing a given attention direction as viewed from the observation point is converted to a broader area than other unit areas. The image output section outputs the generated panoramic image. The projection plane contains a main line that links a position in the attention direction to a position in a direction opposite the attention direction. The panoramic image generation section generates the panoramic image corresponding to the projection plane such that a length of a portion of the main line within the panoramic image corresponding to a unit amount of an angle of rotation around the observation point is maximized at a position closest to the attention direction. The program may be stored on a non-transitory computer-readable information storage medium and then supplied.

According to the present invention, there is provided image data related to a panoramic image that is obtained by converting, to a planar shape, a projection plane onto which a scene within at least a partial range of a virtual sphere as viewed from an observation point is projected. In the panoramic image, a unit area on the virtual sphere containing a given attention direction as viewed from the observation point is converted to a broader area than other unit areas. The projection plane contains a main line that links a position in the attention direction to a position in a direction opposite the attention direction. A length of a portion of the main line within the panoramic image corresponding to a unit amount of an angle of rotation around the observation point is maximized at a position closest to the attention direction.

DESCRIPTION OF EMBODIMENTS

Embodiments of the present invention will now be described in detail with reference to the accompanying drawings.

Image Format of Panoramic Image

An image generation apparatus according to an embodiment generates a panoramic image that contains a scene within the entire or partial range of an omnidirectional view obtained at an observation point. A panoramic image generated by the image generation apparatus according to the present embodiment will be hereinafter referred to as a panoramic image I. The panoramic image I is two-dimensional (planar) image data that contains a scene within the entire or partial range of an omnidirectional view. Here, the term "omnidirectional" denotes all directions viewed from the observation point, including 360-degree horizontal directions (left-right directions) and 180-degree vertical directions (up-down directions) from the zenith to the nadir.

A concrete example of an image format of the panoramic image I in the present embodiment will now be described. An omnidirectional scene viewed from the observation point is expressed on a virtual spherical surface that is centered with respect to the position of the observation point. Here, it is assumed that a virtual sphere corresponding to the omnidirectional scene is a virtual sphere S. For purposes of explanation, a three-axis coordinate system is used here. The three-axis coordinate system is formed by three axes, namely, x-, y-, and z-axes, which are orthogonal to each other. The origin of the three-axis coordinate system is assumed to be the central point O of the virtual sphere S that corresponds to the observation point. It is also assumed that the x- and z-axes are disposed along a horizontal plane, and that the y-axis is disposed along the vertical direction.

A particularly important direction as viewed from the observation point, which is among all directions for capturing an omnidirectional view, is set in the present embodiment. The particularly important direction is hereinafter referred to as the attention direction. Here, it is assumed that the attention direction is set to a positive x-axis direction. The attention direction is a direction that a user is likely to pay particular attention to, or a direction that a generator of the panoramic image I wants the user to pay particular attention to. For example, the attention direction may be a direction in which an important object is imaged. In the present embodiment, the panoramic image I is generated such that its image quality (resolution) increases with a decrease in the distance of the associated area on the virtual sphere S to the attention direction.

Figure 1:
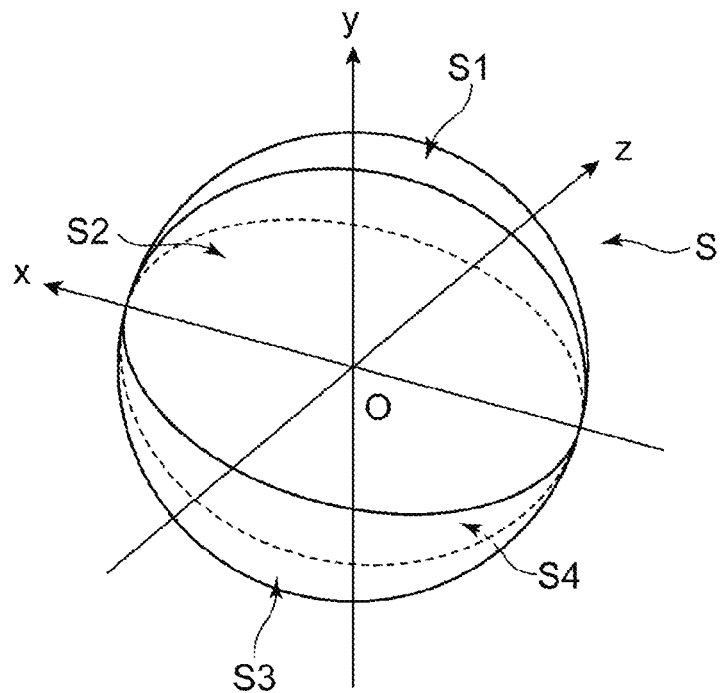
FIG. 1 is a diagram illustrating a virtual sphere corresponding to an omnidirectional scene.

When the virtual sphere S is divided into four parts by two planes that pass through the central point O and are parallel to the attention direction and orthogonal to each other, four ¼ spherical surfaces S1 to S4 are obtained as depicted in FIG. 1. Referring to FIG. 1, the virtual sphere S is divided into four parts by two planes, namely, an xy plane (vertical plane) and an xz plane (horizontal plane). Each of the four ¼ spherical surfaces is symmetrical in shape with respect to a plane that passes through the central point O and is parallel to the attention direction. More specifically, the ¼ spherical surface S1 and the ¼ spherical surface S3 are both symmetrical in shape with respect to a plane expressed by the equation $y=z$. Further, the ¼ spherical surface S2 and the ¼ spherical surface S4 are both symmetrical in shape with respect to a plane expressed by the equation $y=-z$.

Figure 2:
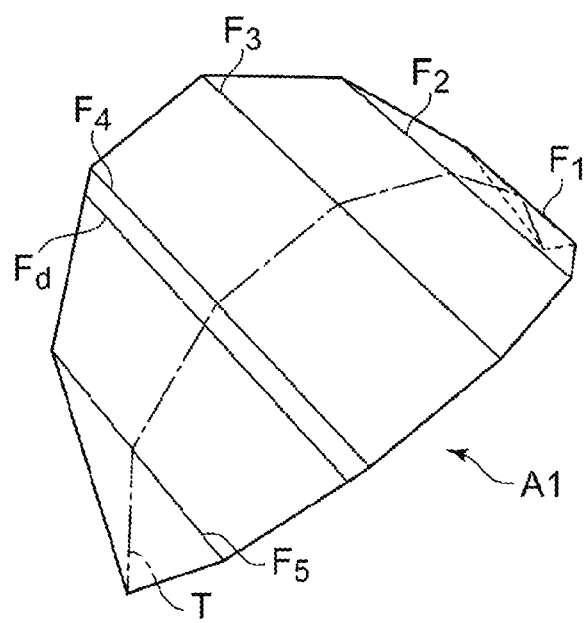
FIG. 2 is a diagram illustrating an example of a projection plane onto which a scene depicting a ¼ spherical surface is to be projected.

By using as an example the ¼ spherical surface S1, which is one of the four ¼ spherical surfaces, a method of generating a part of the panoramic image I containing a scene corresponding to the ¼ spherical surface S1 will now be described. The scene within a range corresponding to the ¼ spherical surface S1 is projected onto a projection plane A1 that is formed by a plurality of interconnected polygons (triangles or quadrangles). FIG. 2 is a perspective view illustrating a concrete example of the projection plane A1. A center line in the projection plane A1 that is disposed along the attention direction is hereinafter referred to as the main line T. As mentioned earlier, the ¼ spherical surface S1 is symmetrical in shape with respect to the plane expressed by the equation $y=z$. Accordingly, the main line T is also disposed on that plane. The plane on which the main line T is disposed (the plane expressed by the equation $y=z$) is hereinafter referred to as the central plane. The main line T expresses a shape that is obtained by cutting the projection plane A1 along the central plane. That is, the main line T connects one end disposed toward the attention direction and the opposing end in the central plane that contains the central point O and is parallel to the attention direction.

Figure 3:
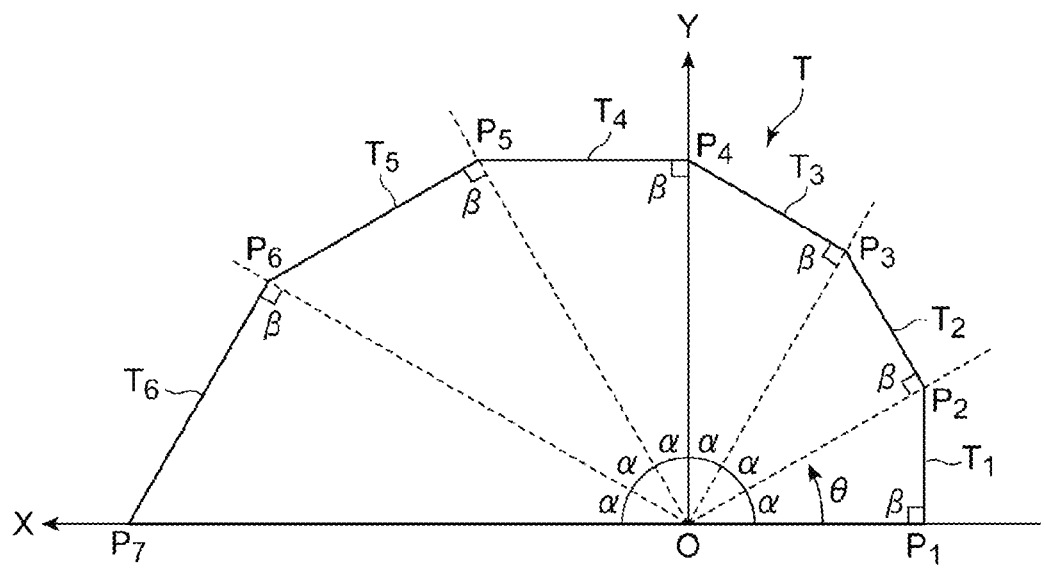
FIG. 3 is a diagram illustrating an example of a main line contained in a projection plane.

FIG. 3 illustrates a concrete example of the shape of the main line T contained in the central plane. Here, it is assumed as an example that the projection plane A1 is formed by connecting six polygons. Meanwhile, the main line T is formed by six line segments as depicted in FIG. 3. Further, it is assumed that a position in the central plane is hereinafter expressed by a two-dimensional coordinate system formed by X- and Y-axes orthogonal to each other. Here, the X-axis coincides with the x-axis in a three-dimensional space, but the Y-axis is obtained by tilting the y-axis 45 degrees toward the z-axis.

A method of determining the shape of the main line T will now be described. Here, it is assumed that the six line segments of the main line T, in order from a direction opposite the attention direction, are sequentially designated as $T_1$, $T_2$, $T_3$, $T_4$, $T_5$, and $T_6$. Further, it is assumed that an endpoint of the main line T toward a direction opposite the attention direction (toward a negative X-axis direction) is designated as a starting point $P_1$, and that the endpoints of the line segments, in order from a side close to the starting point $P_1$, are sequentially designated as relay points $P_2$, $P_3$, $P_4$, $P_5$, and $P_6$. Moreover, it is assumed that the endpoint of the main line T toward the attention direction (toward a positive X-axis direction) is designated as an ending point $P_7$.

The relay points $P_2$ to $P_6$ are disposed such that the angles at which the line segments $T_1$ $T_6$ are viewed from the central point O (i.e., the angles formed by the opposing ends of the line segments and the central point O) are equal to each other. That is, when five auxiliary lines are drawn so as to divide an angle $P_1OP_7$ (=180°) into six equal parts, the relay points $P_2$ to $P_6$ are disposed on the auxiliary lines. More specifically, angles $P_1OP_2$, $P_2OP_3$, $P_3OP_4$, $P_4OP_5$, $P_5OP_6$, and $P_6OP_7$ are equal to each other and 30° (=180°/6). These angles (the angles at which the line segments are viewed from the central point O) are hereinafter referred to as the corresponding angles α. The line segments $T_1$ to $T_6$ cover the range of the corresponding angles α as viewed from the central point O.

The starting point $P_1$ is set at a position that is at a predetermined distance to the central point O toward a direction opposite the attention direction (toward the negative X-axis direction). Here, it is assumed that the position coordinates of the starting point $P_1$ are (X=−1, Y=0). Further, the relay point $P_2$ is set at a position where a straight line passing through the starting point $P_1$ and vertical to a straight line $OP_1$ intersects with the auxiliary line closest to the starting point $P_1$. That is, the position of the relay point $P_2$ is determined such that the angle $P_1OP_2$ is α=30°, and that an angle $OP_1P_2$ is 90°. In this instance, the angle $OP_1P_2$ is referred to as the exit angle β. Moreover, the relay point $P_3$ is determined such that the angle $P_2OP_3$ is 30°, and that an angle $OP_2P_3$ is 90°. The remaining relay points $P_4$ to $P_6$ and the ending point $P_7$ are sequentially determined such that an angle $P_{n-1}OP_n$ (corresponding angle α) is 30°, and that an angle $OP_{n-1}P_b$ (exit angle β) is 90°.

After the positions of the starting point $P_1$, the relay points $P_2$ to $P_6$, and the ending point $P_7$ are determined as described above, the shape of the main line T in the central plane is determined. In this instance, the line segments $T_1$ to $T_6$ differ from each other in length. Further, the lengths of the line segments $T_1$ to $T_6$ increase with a decrease in the distance to the attention direction and decrease with a decrease in the distance to a direction opposite the attention direction. That is, the main line T is asymmetrical in shape with respect to a plane that passes through the central point O and is vertical to the attention direction, and a portion toward the attention direction is longer than a portion toward a direction opposite the attention direction.

Here, assume that the position coordinates in the central plane are expressed by polar coordinates (r, θ). In this instance, the shape of the main line T is expressed by a single-valued function of a polar coordinate system, that is, r=f(θ). The symbol r represents the distance to the central point O. The symbol θ represents an angle value such that the negative X-axis direction is 0° and that the counterclockwise direction is the positive direction. This angle value is not smaller than 0° and not greater than 180°. When the main line T determined by the above method is expressed by a function f as described above, the function f becomes a monotonically increasing function, so that the value r increases with an increase in the value θ. Accordingly, the length of the main line T per unit angle can increase with a decrease in the distance to the attention direction.

After the shape of the main line T is determined, five branch lines $F_1$ to $F_5$ are disposed so as to pass through the relay points $P_2$ to $P_6$, respectively. The branch lines F correspond to ribs when the main line T is viewed as a spine. The branch lines F are disposed in such a manner that they are extended leftward and rightward as viewed in the extension direction of the main line T. More specifically, the branch lines $F_1$ to $F_5$ are disposed in a direction orthogonal to the central plane. Further, each of the branch lines $F_1$ to $F_5$ is disposed such that its midpoint coincides with a relay point on the main line T. The length of each branch line F is determined so as to match the ¼ spherical surface S1.

Figure 4:
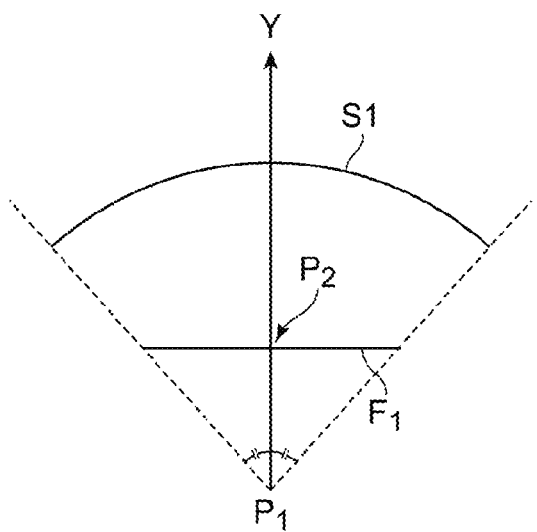
FIG. 4 is a diagram illustrating an example of a branch line contained in a projection plane.

The following describes in detail how, for example, the branch line $F_1$ is disposed. FIG. 4 illustrates a situation in a plane that includes the relay point $P_2$ and the branch line $F_1$ and is vertical to the x-axis. When the ¼ spherical surface S1 is cut along a plane that passes through the relay point $P_2$ and is orthogonal to the attention direction, a fan-shaped circular sector having a central angle of 90° is obtained. Therefore, the length of the branch line $F_1$ is also determined such that an angle of 90° is formed by the opposing ends of the branch line $F_1$ and a point on the x-axis, as depicted in FIG. 4. In this instance, the length of the branch line $F_1$ is two times the distance between the relay point $P_2$ and the x-axis. Meanwhile, the midpoint of the branch line $F_1$ coincides with the relay point $P_2$. Therefore, the branch line $F_1$ is symmetrical with respect to the central plane. As is the case with the branch line $F_1$, the length of each of the branch lines $F_2$ to $F_5$ is also determined such that it is two times the distance between the associated relay point and the x-axis.

When the main line T and the positions of the branch lines $F_1$ to $F_5$ are determined in the above-described manner, the overall shape of the projection plane A1 is determined. That is, the projection plane A1 is shaped by connecting the starting point $P_1$ and the ending point $P_7$ of the main line T and the opposing ends of each branch line F. A scene depicting the ¼ spherical surface S1 is projected onto the projection plane A1. As each of the branch lines $F_1$ to $F_5$ is symmetrical with respect to the central plane, the whole projection plane A1 is also symmetrical with respect to the central plane, as is the case with the ¼ spherical surface S1. It should be noted that a branch line $F_d$ is set on the projection plane A1 in addition to the branch lines $F_1$ to $F_5$. The branch line $F_d$ is a line segment on the projection plane A1 and is parallel to the other branch lines $F_1$ to $F_5$. A method of determining the position of the branch line $F_d$ will be described later.

Figure 5:
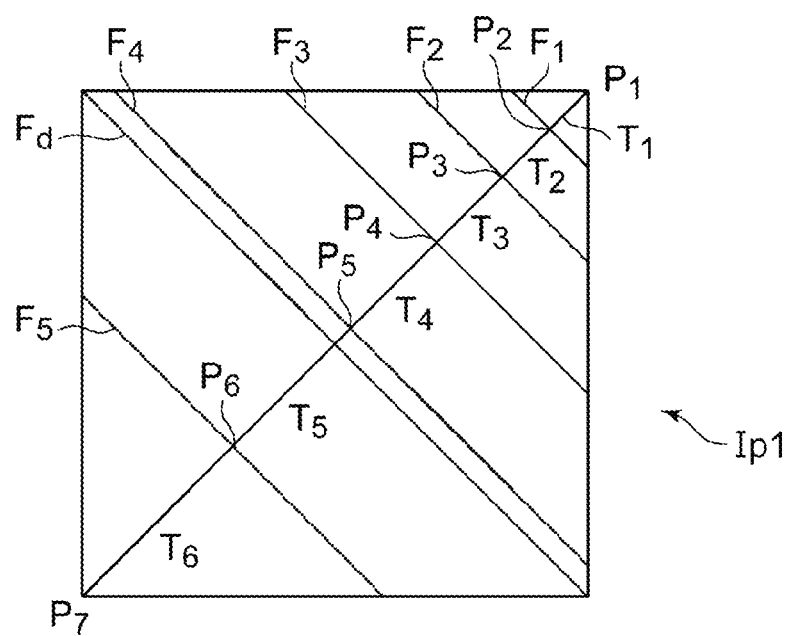
FIG. 5 is a diagram illustrating a part of a panoramic image that is obtained by converting a scene projected onto the projection plane depicted in FIG. 2.

The scene projected onto the projection plane A1 is converted to a planar shape and used as a part of the panoramic image I. An area within the panoramic image I that corresponds to the projection plane A1 is hereinafter referred to as an image portion Ip1. In the present embodiment, it is assumed that the image portion Ip1 is square in shape. FIG. 5 illustrates the image portion Ip1, and depicts the main line T in the projection plane A1 and the line segments corresponding to the branch lines $F_1$ to $F_5$.

As depicted in FIG. 5, the main line T corresponds to one diagonal line of the image portion Ip1. Here, the upper right vertex of the image portion Ip1 corresponds to the starting point $P_1$, and the lower left vertex corresponds to the ending point $P_7$. This diagonal line $P_1P_7$ is divided into six parts.

The six parts correspond to one of the line segments $T_1$ to $T_6$ that form the main line T. The length of each line segment in the image portion Ip1 is determined based on the lengths of the line segments $T_1$ to $T_6$ in the projection plane A1. However, the six line segments need not be converted so as to perfectly keep length ratios on the projection plane A1, but may be converted to lengths that are corrected based on the positions in the central plane.

A concrete example of length correction will now be described. When the length of $OP_1$ in the projection plane A1 is 1, the lengths of the line segments $T_1$ to $T_6$ in the projection plane A1 are as indicated in Table 1 below.

TABLE 1

|  | T1 | T2 | T3 | T4 | T5 | T6 |
|---|---|---|---|---|---|---|
| Length in projection plane A1 | 0.58 | 0.67 | 0.77 | 0.89 | 1.03 | 1.18 |
| Correction coefficient | 1 | 1.15 | 1.33 | 1.54 | 1.77 | 2.05 |
| Corrected length | 0.58 | 0.77 | 1.03 | 1.37 | 1.82 | 2.43 |
| Ratio to overall length of main line T | 0.07 | 0.10 | 0.13 | 0.17 | 0.23 | 0.30 |

The length of each line segment is corrected to a value that is obtained by multiplying by a correction coefficient. The correction coefficient $a_n$ for the nth line segment $T_n$ is calculated from the following equation by using the correction coefficient $a_{n-1}$ for the (n−1)th line segment $T_{n-1}$ (i.e., a neighboring line segment positioned opposite the attention direction), the corresponding angle α, and the exit angle β.

$$a_n = a_{n-1} \times \sin(\beta)/\sin(180° - \alpha - \theta)$$

Here, as regards every line segment, the corresponding angle α=30° and the exit angle β=90°. Thus, the following equation is obtained.

$$a_n = a_{n-1}/\sin 60°$$

Further, as the line segment $T_1$ need not be corrected, $a_1=1$. Thus, for example, $a_2$ is calculated from the following equation.

$$a_2 = 1/\sin 60°$$

Therefore, $a_2$ is approximately 1.15. The correction coefficients for the line segments $T_2$ to $T_6$ are sequentially calculated in the same manner as described above. Table 1 indicates the correction coefficients for the line segments that are calculated from the above equation. The corrected length of each line segment is a value that is obtained by multiplying the length in the projection plane A1 by the associated correction coefficient.

The length of each line segment in the image portion Ip1 is calculated so as to coincide with the corrected length. That is, when the sum of corrected lengths of the line segments $T_1$ to $T_6$ is Lt, the proportion of the length of each line segment in the image portion Ip1 relative to the overall length of the main line T is calculated by dividing the corrected length by Lt. The actual length of each line segment in the image portion Ip1 is a value that is obtained by multiplying the proportion by the length of a diagonal line of the image portion Ip1.

The above-described correction alleviates the discontinuity of change in the length of the main line T with respect to a unit angle. Here, the unit angle denotes the unit amount of the angle θ, which is the angle of rotation around the central point (observation point) O in the central plane containing the main line T. When the angle θ is increased in a case where the shape of the main line T is expressed by the single-valued function r=f(θ) of a polar coordinate system as mentioned earlier, the length of the main line T with respect to the unit amount of the angle θ changes discontinuously at a boundary between one line segment and another. If such discontinuity exists, the extent of an area in the image portion Ip1 corresponding to a unit area on the virtual sphere S (i.e., the density of information contained in an image) also changes discontinuously to produce a detrimental result. However, such discontinuity can be avoided by making the above-described correction through the use of the correction coefficient $a_n$. Meanwhile, the correspondence between the position of a point on each line segment in the projection plane A1 and a position in each line segment in the image portion Ip1 may be determined by performing interpolation calculation based, for example, on linear interpolation.

Each of the branch lines $F_1$ to $F_5$ in the projection plane A1 is converted, within the image portion Ip1, to a line segment parallel to a diagonal line that intersects with a diagonal line corresponding to the main line T. More specifically, the branch lines $F_1$ to $F_5$ are converted so as to pass through the relay points $P_2$ to $P_6$ in the image portion Ip1 as well, as is the case in the projection plane A1. Here, as it is assumed that the image portion Ip1 is square in shape, each branch line F is orthogonal to the main line T.

Further, the diagonal line intersecting with the diagonal line corresponding to the main line T is also set as one branch line F. This is the aforementioned branch line $F_d$. The branch line $F_d$ in the projection plane A1 is set at a position corresponding to the position of a diagonal line in the image portion Ip1.

When the main line T and the correspondence between the branch lines F are determined as described above, a position in the projection plane A1 is converted to a position in the image portion Ip1. More specifically, a triangle enclosed by the branch line $F_1$ and the starting point $P_1$ and a triangle enclosed by the branch line $F_5$ and the ending point $P_7$, which are in the projection plane A1, are respectively converted to an upper right triangle and a lower left triangle, which are in the image portion Ip1. Further, a trapezoid sandwiched between two adjacent branch lines F among the branch lines $F_1$ to $F_5$ and $F_d$ is converted to a trapezoid sandwiched between the same two branch lines F in the image portion Ip1.

When a triangle is converted to a triangle, the position of a point contained in the converted triangle is uniquely determined. Meanwhile, when a quadrangle is converted to a quadrangle, the position of a point contained in the converted quadrangle is not uniquely determined. Therefore, the conversion is performed, for example, in a manner described below. First of all, a position in a direction parallel to the main line T is linearly interpolated. Then, a position in a direction intersecting with the main line T (i.e., a direction parallel to the branch lines F) is linearly interpolated. When the conversion is performed in the above manner, a point on the projection plane A1 corresponds to a position in the image portion Ip1.

The method of converting a quadrangle is not limited to the above-described one. For example, an alternative is to divide a trapezoid formed on the projection plane A1 by two branch lines F into two triangles and convert each of the two triangles on the image portion Ip1. Another alternative is to further divide a triangle or quadrangle on the projection plane A1 by executing a tessellation process and perform conversion on each of polygons obtained by the division. Using the above conversion methods makes it possible to reduce the level of error caused by conversion. The process of converting a polygon to a polygon, such as the tessellation process, can be easily implemented by using, for example, a well-known computer graphics library.

When the above-described conversion is performed, a scene in the ¼ spherical surface S1 is converted to the image portion Ip1 having a planar shape. As for the ¼ spherical surfaces S2 to S4, too, image portions Ip2 to Ip4 are obtained when internal scenes of the ¼ spherical surfaces S2 to S4 are projected onto projection planes A2 to A4 and subjected to the same conversion. The panoramic image I that has a planar shape and contains an omnidirectional scene is generated by arranging the four image portions Ip1 to Ip4 obtained in the above manner.

Figure 6:
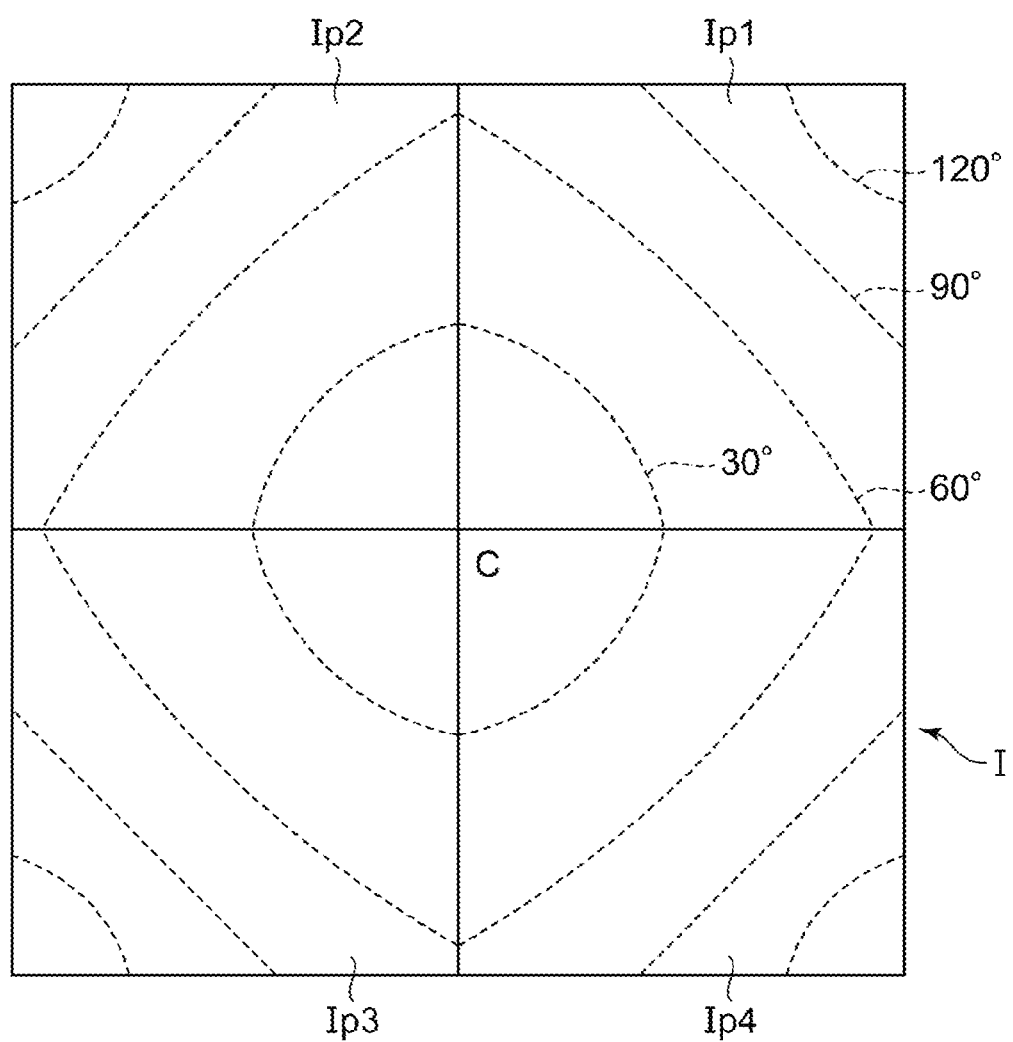
FIG. 6 is a diagram illustrating an example of a panoramic image.

FIG. 6 illustrates an example of the panoramic image I that is obtained in the above-described manner. As each of the image portions is square in shape, the overall shape of the panoramic image I is also square. The center C of the panoramic image I corresponds to the attention direction (positive x-axis direction). Curves depicted in FIG. 6 indicate angular ranges with respect to the attention direction, namely, an angular range of up to 30°, an angular range of up to 60°, an angular range of up to 90°, and an angular range of up to 120°, respectively. As depicted in FIG. 6, an area allocated to a place within the panoramic image I becomes larger with a decrease in the distance to the attention direction. Therefore, the amount of information contained in the panoramic image I increases with a decrease in the distance to the attention direction, and a relatively small amount of information is contained in an image portion positioned opposite the attention direction. When a scene image is drawn by using the above-described panoramic image I, the quality of the drawn image becomes higher with a decrease in the distance to the attention direction.

Figure 7:
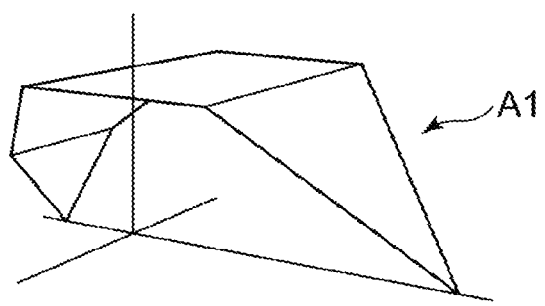
FIG. 7 is a diagram illustrating another example of a projection plane.

The foregoing description assumes that the projection plane A1 is formed by six polygons and that the main line T is formed by six line segments accordingly. However, the present invention is not limited to such a configuration. The main line T may alternatively be formed by three or more line segments. FIG. 7 illustrates the shape of the projection plane A1 in a case where the main line T is formed by four line segments and the shape of the projection plane A1 is determined by performing the same procedure as described above. When the main line T is formed by a smaller number of line segments as described above, the difference in information density between the attention direction and a direction opposite the attention direction increases. Conversely, when the main line T is formed by an increased number of line segments, the shape of the main line T approaches the shape of a semicircle to decrease the difference in information density between the attention direction and a direction opposite the attention direction.

Further, the foregoing description assumes that a plurality of line segments forming the main line T are determined in such a manner that their corresponding angles α are equal to each other. Alternatively, however, the corresponding angles α of the line segments may differ from each other.

Furthermore, the foregoing description assumes that the exit angle β is 90°. Alternatively, however, the exit angle β may be any angle that is greater than 90° and smaller than 180°. If the exit angle is 90°≤β<180°, the function r=f(θ) expressing the shape of the main line T is a monotonically increasing function. Therefore, the plurality of line segments forming the main line T can become longer with a decrease in the distance to the attention direction. However, it is necessary that the exit angle β satisfy the relational expression α+β<180° with respect to the next corresponding angle α. Even when the corresponding angle α and the exit angle β of each of the line segments forming the main line T take values different from those mentioned above as described above, the aforementioned correction coefficients $a_n$ can be sequentially calculated from the same equation.

Moreover, the main line T may be partially or entirely formed by a curve. In such a case, too, by defining the shape of the main line T such that the function r=f(θ) is a monotonically increasing function, an area in the panoramic image I corresponding to a unit area on the virtual sphere S becomes larger with a decrease in the distance to the attention direction.

A concrete example of the above function will now be described. For example, the main line T may be a curve defined by the function $f(\theta)=e^{a\theta}$, where a is a coefficient taking a positive value. In this case, the main line T is such that the length per unit angle exponentially increases with a decrease in the distance to the attention direction. If the coefficient a is expressed by the following equation, the curve defined by the above function is such that the length ratio per 30° coincides with the length ratio obtained by weighting each of the line segments forming the main line T illustrated in FIG. 3.

$$a=6\times\log(4/3\times\pi)$$

Figure 8:
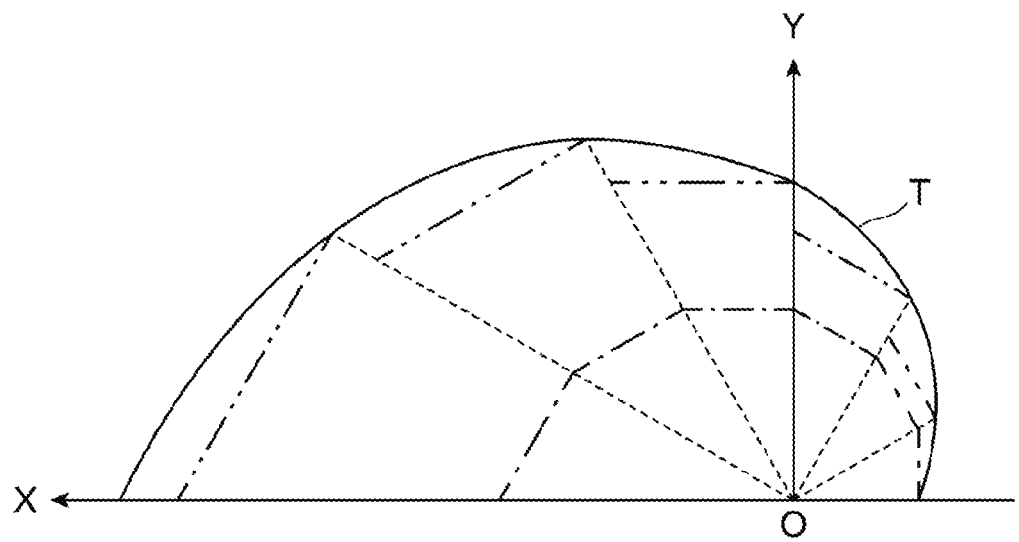
FIG. 8 is a diagram illustrating another example of a part of a panoramic image.

FIG. 8 depicts the shape of the main line T formed by the above curve. In FIG. 8, the main line T in FIG. 3 is depicted by a one-dot chain line for comparison purposes. Further, a two-dot chain line in FIG. 8 represents distance changes that are applied, in accordance with the main line T formed by the curve, to line segments $T_2$ to $T_6$ other than the line segment $T_1$ forming the main line T in FIG. 3. The length ratio between each line segment subjected to a distance change and the main line T formed by the curve corresponding to the same angular range is constant at any angle.

Further, the branch lines F are not limited to those that are shaped and disposed in the above-described manner. For example, the branch lines F may pass through the associated relay points, and may be formed by a plurality of line segments in a plane vertical to the attention direction. Alternatively, the branch lines F may be arc-shaped or otherwise shaped to include a curve. In any case, the branch lines F are determined such that they are symmetrical in shape with respect to the central plane, and that the angles at which the branch lines F are viewed from a point on the x-axis (the angles formed by the opposing ends of the branch lines F and the central angle O) coincide with the associated ¼ spherical surfaces (i.e., the angles are equal to 90°). Moreover, the branch lines F may pass through the associated relay points and the central point O, and may be disposed in a plane vertical to the central plane.

Further, the foregoing description assumes that the attention direction is a direction parallel to the horizontal plane. However, the present invention is not limited to such an attention direction. Alternatively, the attention direction may be set omnidirectionally as desired. In such a case, too, by determining the positions of the projection planes A1 to A4 with reference to the attention direction such that the central plane is parallel to the attention direction, the panoramic image I can be generated such that the amount of information increases with a decrease in the distance to the attention direction. Meanwhile, the orientation for dividing the virtual sphere S into the ¼ spherical surfaces may also be set as desired.

Furthermore, the foregoing description assumes that the panoramic image I contains all omnidirectional scenes. However, the panoramic image I according to the present embodiment is not limited to such a configuration. The panoramic image I may alternatively contain only a scene within a partial range of an omnidirectional view. For example, the panoramic image I may contain a scene corresponding to only one of the ¼ spherical surfaces S1 to S4 or a scene corresponding to two ¼ spherical surfaces (i.e., a hemisphere).

Moreover, the panoramic image I according to the present embodiment may be generated by converting, to an image portion, only a scene within a partial range of a certain ¼ spherical surface. In such a case, pixels having dummy information (e.g., pixels having a pixel value of 0) in the panoramic image I may be within a range within which the scene is not projected. This makes it possible to generate the panoramic image I by the method described in conjunction with the present embodiment even when information is not available concerning a scene within a partial range, for example, a scene within a high-latitude range close to the nadir. Further, each of the projection planes A1 to A4 corresponding to the ¼ spherical surfaces may be converted to an image portion having a shape other than a square (e.g., a rectangular shape).

An exemplary variation of the panoramic image I according to the present embodiment will now be further described.

The foregoing description assumes that the shape of the main line T can be expressed by the monotonically increasing function $r=f(\theta)$, which uses the angle $\theta$ of a polar coordinate system as a variable. That is, the main line T is shaped such that the length per unit angle increases with a decrease in the distance to the attention direction ($\theta=180°$). This makes it possible to increase the amount of information regarding an area close to the attention direction in the panoramic image I. However, the shape of the main line T is not limited to the above-described one. The main line T may not be shaped such that the length per unit angle increases with a decrease in the distance to the attention direction. The main line T may be shaped such that, for example, a portion toward the attention direction and a portion toward a direction opposite the attention direction are symmetrical as viewed from the central point O. For example, the shape of the main line T may be close to semicircular.

Even if the main line T is shaped as described above, when the ratio of conversion of each portion of the projection plane is changed for converting the projection plane containing the main line T to the panoramic image I having a planar shape, the same advantages are obtained as in the case where the main line T is shaped such that the length per unit angle increases with a decrease in the distance between the main line T and the attention direction. More specifically, each of a plurality of portions of the main line T is converted such that the length in the panoramic image I increases with a decrease in the distance to the attention direction. This makes it possible to generate the panoramic image I such that its amount of information per unit angle increases with a decrease in the distance of the associated area to the attention direction. In the present example, the length per unit angle of the main line T in the projection plane does not increase with a decrease in the distance to the attention direction. However, the length per unit angle of the main line T in the panoramic image I increases with a decrease in the distance to the attention direction.

That is, the correspondence between the main line T in the panoramic image I and the main line T in the projection plane is defined such that the unit length of the main line T in the panoramic image I corresponds to the angle $\theta$ that increases with a decrease in the distance to the attention direction in the projection plane. Here, the unit length of the main line T in the panoramic image I may be a length that corresponds to the pixel size of each pixel in the panoramic image I. Performing conversion between the projection plane and the panoramic image I in accordance with the above correspondence makes it possible to provide a video having a resolution that increases with a decrease to the attention direction.

The foregoing description assumes that the length per unit angle of the main line T in the panoramic image I consistently continues to increase with a decrease in the distance to the attention direction. However, the length per unit angle may temporarily decrease depending on the structure of the projection plane and on the definition of the correspondence. Even in such a case, the panoramic image I containing a large amount of information in the vicinity of the attention direction can be generated as long as the correspondence is defined such that the length per unit angle is maximized at a position closest to the attention direction.

Figure 9:
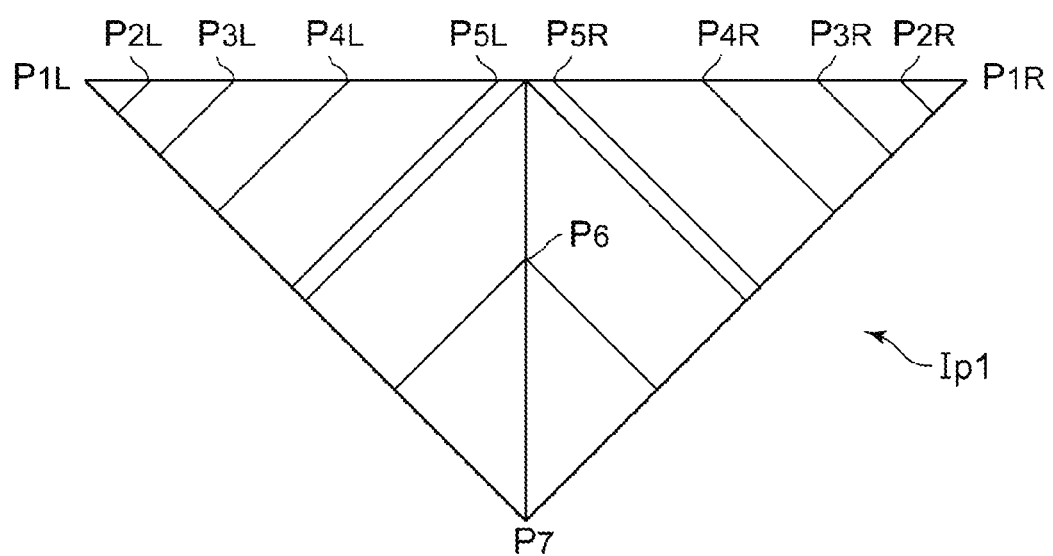
FIG. 9 is a diagram illustrating an example of the main line formed by a curve.

Further, the foregoing description assumes that the panoramic image I containing an omnidirectional scene is generated by converting a projection plane corresponding to one ¼ spherical surface into a square-shaped image portion illustrated in FIG. 4 and arranging four pieces of the image portion obtained by conversion. However, the image portion corresponding to a ¼ spherical surface is not limited to the one shaped as described above. For example, a scene contained in a ¼ spherical surface may be converted to the shape of an isosceles right triangle. FIG. 9 illustrates an example of an image portion in such a case. In the example of FIG. 9, the image portion Ip1 containing a scene depicting the ¼ spherical surface S1 is illustrated, as is the case with FIG. 5, and the vertex angle of the isosceles right triangle corresponds to the attention direction. Further, the main line T is formed by the base of the isosceles right triangle and a perpendicular line extended from the vertex angle to the base. A half of the main line T that is positioned opposite the attention direction corresponds to both of two line segments obtained by dividing the base into two parts. Accordingly, the starting point $P_1$ corresponds to points $P_{1L}$ and $P_{1R}$, which correspond to left and right base angles. Similarly, the relay points $P_2$ to $P_5$ correspond to two points on the base. The panoramic image I having an overall square shape can be generated by arranging four pieces of the above-described image portion in such a manner that the vertex angles corresponding to the attention direction overlap at the center. In the present example, too, each of the polygons enclosed by the main line T and branch lines in the projection plane is converted to a triangle or a trapezoid within the panoramic image I.

Configuration and Functions of Image Display System

A configuration of an image display system 1 according to an embodiment of the present invention will now be described. The image display system 1 includes an image generation apparatus 10 and an image display control apparatus 20.

Figure 10:
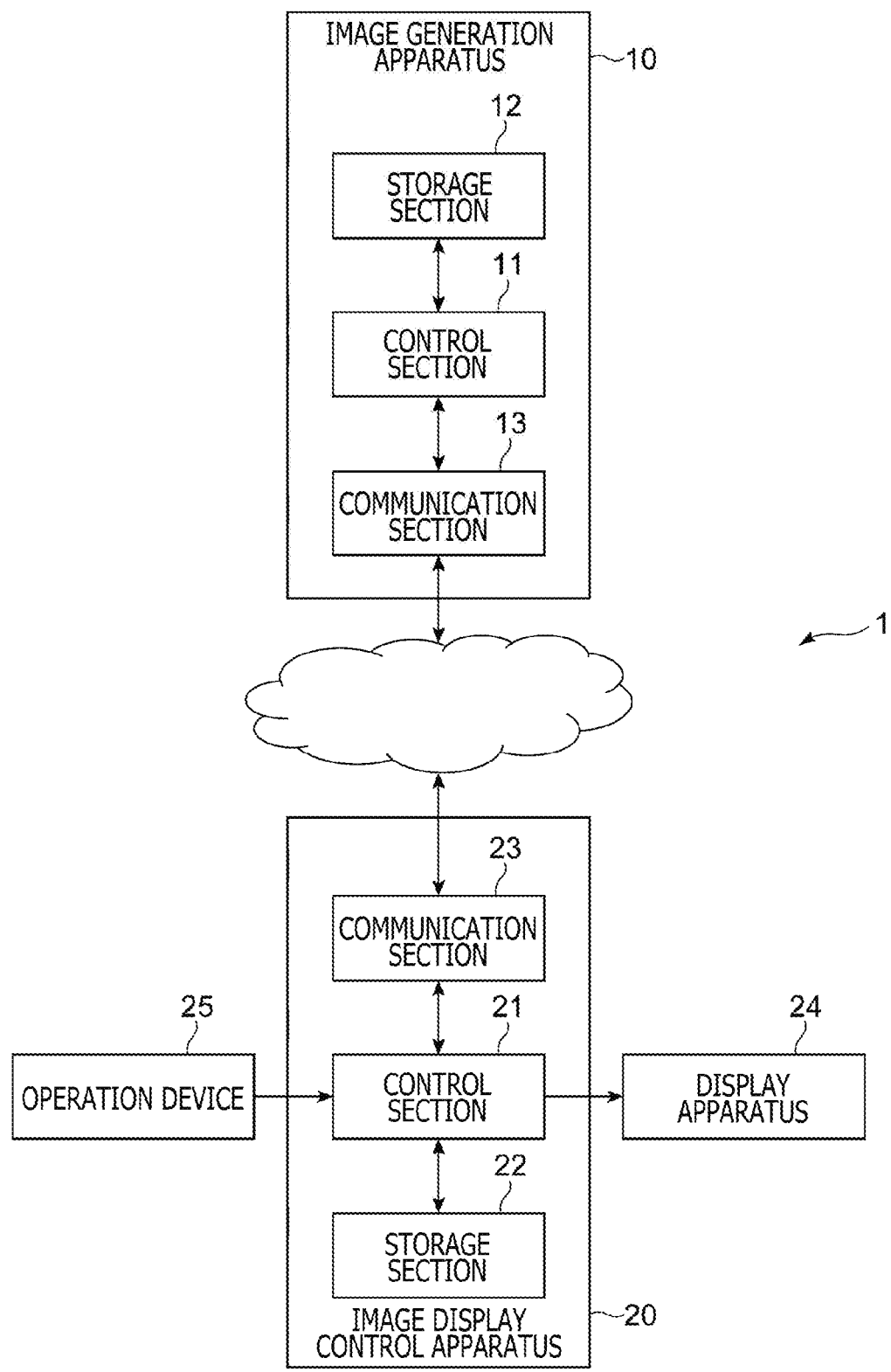
FIG. 10 is a block diagram illustrating a configuration of an image display system.

The image generation apparatus 10 is an information processing apparatus generating the panoramic image I, and may be, for example, a home gaming machine, a mobile gaming machine, a personal computer, a smartphone, or a tablet. As illustrated in FIG. 10, the image generation apparatus 10 includes a control section 11, a storage section 12, and a communication section 13.

The control section 11 includes at least one central processing unit (CPU) or other processor, and performs various information processing by executing a program stored in the storage section 12. In the present embodiment, in particular, the control section 11 performs a process of generating the panoramic image I. The storage section 12 includes at least one random access memory (RAM) or other memory device, and stores a program to be executed by the control section 11 and data to be processed by the program. The communication section 13 is a local area network (LAN) card or other communication interface, and transmits data concerning the panoramic image Ito the image display control apparatus 20 through a communication network.

The image display control apparatus 20 is an information processing apparatus providing image display control based on the panoramic image I generated by the image generation apparatus 10. As is the case with the image generation apparatus 10, the image display control apparatus 20 may be, for example, a home gaming machine, a mobile gaming machine, a personal computer, a smartphone, or a tablet. The image display control apparatus 20 includes a control section 21, a storage section 22, and a communication section 23. Further, the image display control apparatus 20 is connected to a display apparatus 24 and an operation device 25.

The control section 21 includes at least one CPU or other processor, and performs various information processing by executing a program stored in the storage section 22. In the present embodiment, in particular, the control section 21 performs a process of drawing a display image based on the panoramic image I. The storage section 22 includes at least one RAM or other memory device, and stores a program to be executed by the control section 21 and data to be processed by the program. The communication section 23 is a LAN card or other communication interface, and receives data transmitted from the image generation apparatus 10 through the communication network.

The display apparatus 24 is, for example, a liquid-crystal display, and displays an image based on a video signal supplied from the image display control apparatus 20. The display apparatus 24 may be a stereoscopic image display apparatus that displays a stereoscopically viewable image supplied from the image display control apparatus 20. Further, the display apparatus 24 may be, for example, a head-mounted display apparatus that can be worn on the head of the user.

The operation device 25 is, for example, a controller or pointing device for a home gaming machine, and used by the user to issue various instructions to the image generation apparatus 10. The instructions issued by the user through the operation device 25 are transmitted to the image display control apparatus 20 in a wired or wireless manner. The operation device 25 may include, for example, operation buttons and a touch panel disposed on the housing surface of the image display control apparatus 20.

Figure 11:
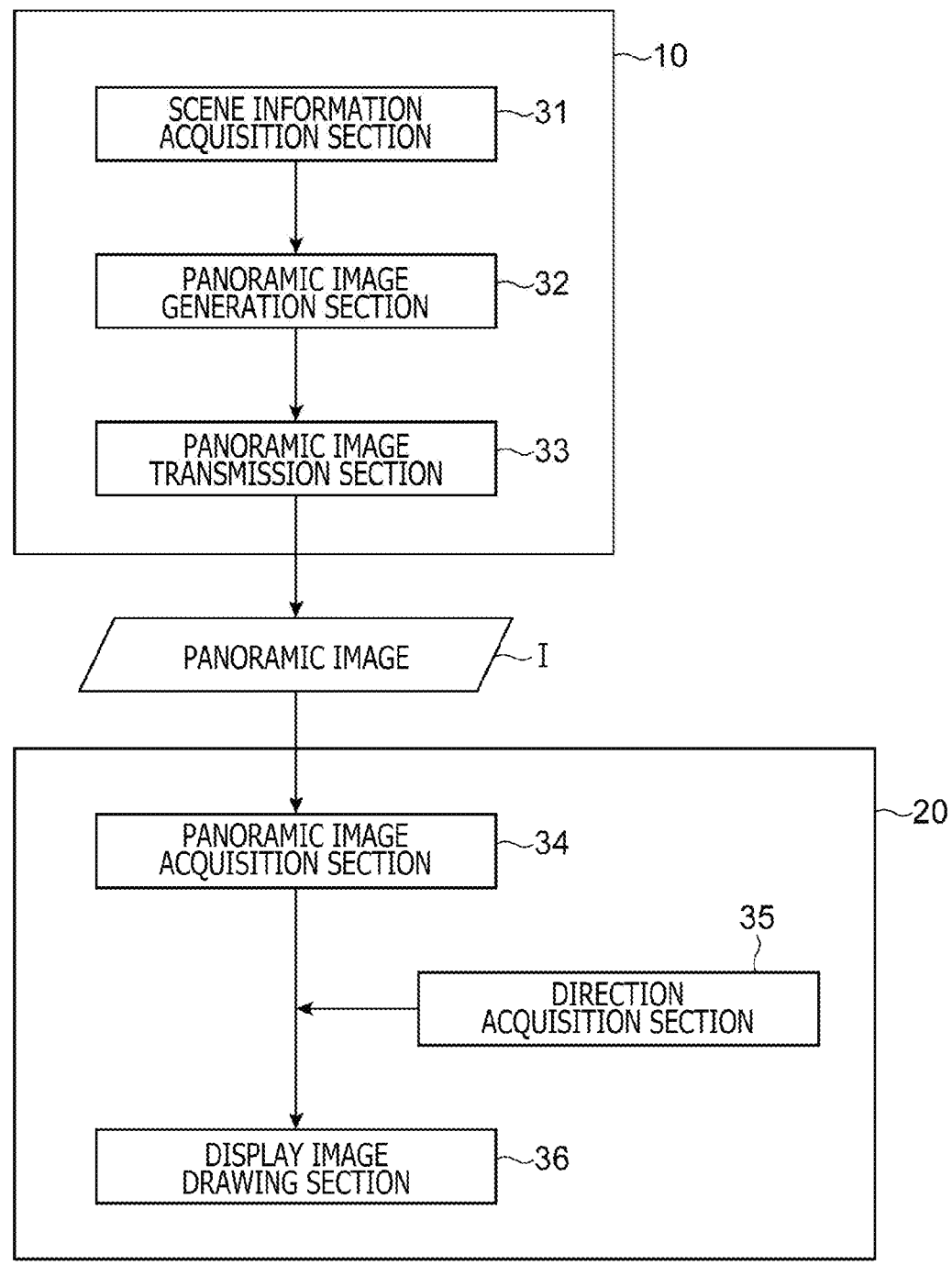
FIG. 11 is a block diagram illustrating the functions of the image display system.

Functions implemented by the image generation apparatus 10 and the image display control apparatus 20 will now be described with reference to FIG. 11. As illustrated in FIG. 11, the image generation apparatus 10 functionally includes a scene information acquisition section 31, a panoramic image generation section 32, and a panoramic image transmission section 33. The functions of these sections are implemented when the control section 11 executes a program stored in the storage section 12. Meanwhile, the image display control apparatus 20 functionally includes a panoramic image acquisition section 34, a direction acquisition section 35, and a display image drawing section 36. The functions of these sections are implemented when the control section 21 executes a program stored in the storage section 22. Programs to be executed by the apparatuses may be supplied to the apparatuses through the communication network such as the Internet or may be stored on an optical disk or other computer-readable information storage medium and supplied to the apparatuses.

The scene information acquisition section 31 acquires scene information that is used as original data for generating the panoramic image I. The scene information is necessary for identifying the color (pixel value) of each unit area on the surface of the virtual sphere S when an omnidirectional scene viewed from the observation point is projected onto the virtual sphere S. For example, the scene information may be a panoramic image that is generated in an equirectangular projection format or other image format different from the image format according to the present embodiment. The scene information may also be image data on a panoramic image captured by a panoramic camera. The scene information acquisition section 31 may receive the scene information from another apparatus through the communication network or read the scene information from a camera or other device connected to the image generation apparatus 10. The scene information acquisition section 31 may also read the scene information stored in a flash memory or other information storage medium.

The panoramic image generation section 32 generates the panoramic image I by using the scene information acquired by the scene information acquisition section 31. As mentioned earlier, the panoramic image I is two-dimensional image data that contains a scene within the entire or partial range of an omnidirectional view. More specifically, the panoramic image generation section 32 determines the attention direction and the positions and shapes of the projection planes A1 to A4 under given conditions. Then, based on the aforementioned correspondence between a position in the projection planes and a position in the panoramic image I, the panoramic image generation section 32 generates the panoramic image I by calculating the pixel value of each pixel in the panoramic image I in accordance with the scene information.

The correspondence between a position in the projection planes and a position in the panoramic image I is determined based on the positions and shapes of the projection planes. As described thus far, the positions and shapes of the projection planes are then defined in accordance with the orientation of the attention direction and with the positions and shapes of the main line T and branch lines F. Information defining the positions and shapes of the projection planes is necessary for the image display control apparatus 20 to use the panoramic image I in order to reproduce a scene contained in the panoramic image I. Thus, the panoramic image generation section 32 associates such information defining the configuration of the panoramic image I (this information is hereinafter referred to as the image definition information) with the generated panoramic image I, and outputs the image definition information associated with the generated panoramic image I.

Further, the panoramic image generation section 32 may generate stereoscopic panoramic image data. The image data generated in this case may be, for example, rectangular image data that has an aspect ratio of 1:2, contains a square panoramic image I in the left half for generating a left-eye image, and contains a square panoramic image I in the right half for generating a right-eye image. Moreover, the panoramic image generation section 32 may generate the panoramic image I as a moving image that changes over time.

The panoramic image transmission section 33 transmits the panoramic image I generated by the panoramic image generation section 32 to the image display control apparatus 20. In this instance, the panoramic image transmission section 33 transmits the image definition information together with the panoramic image I.

The panoramic image acquisition section 34 acquires the panoramic image I by receiving the panoramic image I transmitted from the panoramic image transmission section 33 of the image generation apparatus 10. Here, it is assumed that the panoramic image acquisition section 34 directly receives the panoramic image I, which is transmitted from the image generation apparatus 10 through the communication network. However, the present invention is not limited to such a configuration. Alternatively, the panoramic image acquisition section 34 may receive the panoramic image I through a server computer or other apparatus.

Based, for example, on a user instruction, the direction acquisition section 35 acquires direction information that is used to determine the visual field range (display range) of a display image appearing on the display apparatus 24. The direction information acquired by the direction acquisition section 35 is used as an imaging direction of a virtual camera when the later-described display image drawing section 36 generates the display image. The imaging direction is defined, for example, by the yaw angle indicative of a horizontal angle and the pitch angle indicative of a vertical angle. Further, the direction acquisition section 35 may additionally acquire the roll angle indicative of the rotation angle of the camera around a rotation axis representative of the imaging direction.

More specifically, the direction acquisition section 35 acquires the direction information by receiving a user instruction that is inputted to the operation device 25 in order to specify the direction. Alternatively, the direction acquisition section 35 may acquire the direction information from the result of detection by a motion sensor built in the image display control apparatus 20 when the user tilts the main body of the image display control apparatus 20. This enables the user to change the visual field range to a desired orientation by changing the orientation of the image display control apparatus 20 in a case where, for example, the image display control apparatus 20 has a small-size housing as is the case with a smartphone or a tablet. Further, when the display apparatus 24 is a head-mounted display apparatus, the direction acquisition section 35 may acquire the direction information from the result of detection by a motion sensor built in the display apparatus 24. This makes it possible to change the visual field range in accordance with a change in the orientation of the head of the user.

Based on the panoramic image I acquired by the panoramic image acquisition section 34, the display image drawing section 36 draws a display image depicting a scene within the visual field range determined according to the direction information acquired by the direction acquisition section 35, and causes the display apparatus 24 to display the drawn display image. This enables the user to view a scene within a particular visual field range contained in the panoramic image I. Further, the user is able to view a scene in a desired direction within an omnidirectional view, for example, by inputting an instruction to the operation device 25 in order to change the visual field range.

More specifically, the display image drawing section 36 disposes the projection planes A1 to A4 in a virtual space in accordance with the image definition information transmitted together with the panoramic image I. In addition, the display image drawing section 36 disposes the virtual camera at the center position of the virtual space (a position corresponding to the central point O of the virtual sphere S). In this instance, the disposed virtual camera is oriented and tilted in accordance with the direction information acquired by the direction acquisition section 35.

Subsequently, the display image drawing section 36 attaches a texture to the insides of the projection planes A1 to A4. The texture to be attached is generated based on the panoramic image I. As a concrete example, when performing a drawing process by using the panoramic image I illustrated in FIG. 6, the display image drawing section 36 disposes, in the virtual space, the projection plane A1 illustrated, for example, in FIG. 2. Further, the display image drawing section 36 disposes the projection planes A2 to A4, which are identical in shape to the projection plane A1, in such a manner that the disposed projection planes A2 to A4 are rotated 90 degrees away from each other. Then, an image contained in the image portion Ip1 illustrated in FIG. 5 is attached to the inside of the projection plane A1 as the texture. More specifically, the display image drawing section 36 divides the image portion Ip1 into five trapezoids and two triangles by using the branch lines $F_1$ to $F_5$ and $F_d$. The polygons obtained by the division, such as the trapezoids and the triangles, are then subjected to the inverse of affine transformation applied for image generation in order to convert the polygons to a shape based on the corresponding plane of the projection plane A1. The texture derived from the conversion is then attached to the inside of the projection plane A1. For example, the upper right triangle formed by the starting point $P_1$ and the branch line $F_1$ within the image portion Ip1 is attached to a triangular portion having a vertex at the starting point $P_1$ in the projection plane A1. Similarly, the trapezoid sandwiched between the branch lines $F_1$ and $F_2$ in the image portion Ip1 is converted to a trapezoid sandwiched between the branch lines $F_1$ and $F_2$ in the projection plane A1 as well. In this manner, all the polygons in the panoramic image I, such as the triangles and the trapezoids, are converted to shapes based on the corresponding projection planes A1 to A4 and then attached. This process is implemented, for example, by a well-known vertex shader. Moreover, the display image drawing section 36 may divide a trapezoid into a plurality of smaller polygons by performing the tessellation process as mentioned earlier, and convert each of the polygons obtained by the division. At least a part of the above-described drawing process may be implemented, for example, by a graphics processing unit (GPU).

Subsequently, the display image drawing section 36 generates a display image by drawing the appearance of the projection planes A1 to A4 to which the above texture is attached, as viewed from the virtual camera disposed at the position corresponding to the central point O of the virtual sphere S. When, for example, the virtual camera is oriented toward the attention direction, the drawn display image contains an area close to the ending point $P_7$ of the projection plane A1 and areas of the projection planes A2 to A4 that are adjacent to the former area.

Here, the panoramic image I is in an image format such that a larger area is occupied in an area close to the attention direction as mentioned earlier. When a display image is generated based on such a panoramic image I, the generated display image depicts a scene with higher resolution in the vicinity of the attention direction than in the other areas.

Further, the present embodiment is configured such that the display image drawing section 36 updates the display image in real time in accordance with a change in the direction acquired by the direction acquisition section 35. That is, when the direction acquired by the direction acquisition section 35 is changed, the display image drawing section 36 changes the orientation of the virtual camera to a direction corresponding to the changed direction. More specifically, when the pitch angle and the yaw angle are changed, the imaging direction of the virtual camera is changed to match the changes in the pitch and yaw angles. Further, when the roll angle is changed, the virtual camera is tilted around a rotation axis representative of the imaging direction as needed to match the change in the roll angle. This causes the visual field range of the virtual camera to change as needed to match the change in the direction acquired by the direction acquisition section 35. The display image drawing section 36 updates the display image by redrawing the appearance of the insides of the projection planes A1 to A4 in accordance with the updated visual field range, and displays the updated display image on the screen of the display apparatus 24. The display image drawing section 36 repeatedly performs, at predetermined intervals, such a process of redrawing (updating) the display image in accordance with a change in the direction acquired by the direction acquisition section 35. As far as control is exercised as described above, the user is able to move the visual field range in order to view a scene at a desired omnidirectional position in the panoramic image I.

Further, in accordance, for example, with a user instruction, the direction acquisition section 35 may acquire position information regarding the virtual camera in addition to the information regarding the orientation of the virtual camera. In such an instance, the display image drawing section 36 translates the virtual camera in the virtual space in accordance with a change in the position information. This makes it possible to display the appearance of a scene attached to the projection planes A1 to A4 as viewed from a different position.

The foregoing description assumes that the display image is a single planar image. However, the display image drawing section 36 may alternatively draw a stereoscopic image. In such a case, the display image drawing section 36 is configured such that two virtual cameras arranged side by side are disposed at the center of the projection planes A1 to A4. Then, a left-eye display image is generated by drawing the appearance, as viewed from the left virtual camera, of the insides of the projection planes A1 to A4 to which the texture generated based on a left-eye panoramic image I is attached. Similarly, a right-eye display image is generated by drawing the appearance, as viewed from the right virtual camera, of the insides of the projection planes A1 to A4 to which the texture generated based on a right-eye panoramic image I is attached. When the two generated display images are displayed on the display apparatus 24 capable of displaying a stereoscopic image, the user is able to stereoscopically view an omnidirectional scene.

As described above, the present embodiment generates the panoramic image I in an image format such that the amount of information per unit area of the virtual sphere S providing omnidirectional imaging increases with a decrease in the distance to the attention direction. Therefore, it is possible to display an important portion with high resolution and relatively reduce the overall amount of data contained in the panoramic image I.

The foregoing description assumes that the image generation apparatus 10 transmits the panoramic image I to the image display control apparatus 20 through the communication network. However, the present invention is not limited to such a configuration. An alternative is to allow the image generation apparatus 10 write the panoramic image I into a flash memory or other information storage medium and allow the image display control apparatus 20 to acquire the panoramic image I by reading it from such an information storage medium. Further, the foregoing description assumes that, for example, the image generation apparatus 10 and the image display control apparatus 20 are independent of each other. Alternatively, however, a single information processing apparatus may be allowed to generate the panoramic image I and control the display of the generated panoramic image I.

Moreover, the foregoing description assumes that the display image drawing section 36 references the image definition information and disposes, in the virtual space, the projection plane having the same shape as in the generation of the panoramic image I. However, the embodiments of the present invention are not limited to such a configuration. For example, based on the panoramic image I corresponding to the projection plane illustrated in FIG. 2, the display image drawing section 36 may attach a texture to a spherical projection plane and draw a display image. In such a case, the display image drawing section 36 references the image definition information to identify an area occupied by individual portions in the panoramic image I within the projection plane, and attaches the texture generated based on the individual portions to the identified area. When the above-described process is performed, the texture depicting a scene contained in the panoramic image I can be developed on a projection plane differing in shape from the projection plane for the generation of the panoramic image I.

Particularly, if the distance between the virtual camera and the projection plane at the time of display image drawing changes in accordance with the orientation of the virtual camera in a case where the display image drawing section 36 draws the left- and right-eye images for implementing a stereoscopic image based on parallax as described earlier, the apparent distance to objects at the same distance changes in accordance with the orientation of the virtual camera. This may cause the user to feel uncomfortable in some cases. When a projection plane similar to a spherical one is used to draw the display image, the distance between the virtual camera and the projection plane remains unchanged irrespective of the orientation of the virtual camera.

A concrete example of a process of rendering to a spherical projection plane will now be described. First of all, the display image drawing section 36 divides the panoramic image I into relatively small triangular areas by performing the tessellation process. For example, the display image drawing section 36 divides the panoramic image I into small squares arranged in a grid, and further divides each of the small squares into two small triangular areas along a diagonal line facing the center of the panoramic image I. The position in the virtual space of a vertex of each of the small triangular areas, which are obtained by the division, is calculated. In this instance, the position of each vertex is calculated based on the shape of a projection plane prevailing at the time of the generation of the original panoramic image I (i.e., based on the position information regarding the main line T and the branch lines F). Then, the display image drawing section 36 disposes the small triangular areas in the virtual space in such a manner as to form a substantially spherical shape in accordance with the calculated position of each vertex. This makes it possible to generate a spherical projection plane reproducing a scene contained in the panoramic image I.

Here, it is assumed that each of the small triangular areas is disposed at a substantially equal distance from the central point (the position of the virtual camera). However, the present invention is not limited to such a configuration. Alternatively, the distance to each of the small triangular areas may be varied while the orientation from the point of regard is maintained. This makes it possible to change the distance to a projection plane in accordance with the orientation.

REFERENCE SIGNS LIST

1 Image display system
10 Image generation apparatus
11, 21 Control section
12, 22 Storage section
13, 23 Communication section
20 Image display control apparatus
24 Display apparatus
25 Operation device
31 Scene information acquisition section
32 Panoramic image generation section
33 Panoramic image transmission section
34 Panoramic image acquisition section
35 Direction acquisition section
36 Display image drawing section

The invention claimed is:

1. An image generation apparatus comprising:
a panoramic image generation section generating a panoramic image that is obtained by converting, to a planar shape, a projection plane onto which a scene within at least a partial range of a virtual sphere as viewed from an observation point is projected, the panoramic image being such that a unit area on the virtual sphere containing a given attention direction as viewed from the observation point is converted to a broader area than other unit areas; and
an image output section outputting the generated panoramic image,
wherein the projection plane contains a main line that links a position in the attention direction to a position in a direction opposite the attention direction, and
the panoramic image generation section generates the panoramic image corresponding to the projection plane such that a length of a portion of the main line within the panoramic image corresponding to a unit amount of an angle of rotation around the observation point is maximized at a position closest to the attention direction.

2. The image generation apparatus according to claim 1, wherein the panoramic image generation section generates the panoramic image corresponding to the projection plane such that, when the projection plane is converted to the panoramic image, a length of a portion of the main line within the panoramic image corresponding to a unit amount of an angle of rotation around the observation point increases with a decrease in a distance to the attention direction.

3. The image generation apparatus according to claim 2, wherein the projection plane is formed symmetrically with respect to the main line, and the main line is shaped such that a distance from the observation point increases with a decrease in the distance to the attention direction.

4. The image generation apparatus according to claim 1, wherein the projection plane is shaped such that a plurality of polygons are interconnected.

5. The image generation apparatus according to claim 1, wherein a point corresponding to the attention direction within the panoramic image is positioned at a center of the panoramic image.

6. An image display control apparatus comprising:
an acquisition section acquiring a panoramic image that is obtained by converting, to a planar shape, a projection plane onto which a scene within at least a partial range of a virtual sphere as viewed from an observation point is projected, the panoramic image being such that a unit area on the virtual sphere containing a given attention direction as viewed from the observation point is converted to a broader area than other unit areas; and
a drawing section drawing a display image depicting a scene within a given visual field range in accordance with the acquired panoramic image, and displaying the drawn display image on a screen of a display apparatus,
wherein the projection plane contains a main line that links a position in the attention direction to a position in a direction opposite the attention direction, and
the panoramic image is obtained by converting the projection plane such that a length of a portion of the main line within the panoramic image corresponding to a unit amount of an angle of rotation around the observation point is maximized at a position closest to the attention direction.

7. An image generation method comprising:
generating a panoramic image that is obtained by converting, to a planar shape, a projection plane onto which a scene within at least a partial range of a virtual sphere as viewed from an observation point is projected, the panoramic image being such that a unit area on the virtual sphere containing a given attention direction as viewed from the observation point is converted to a broader area than other unit areas; and
outputting the generated panoramic image,
wherein the projection plane contains a main line that links a position in the attention direction to a position in a direction opposite the attention direction, and
the generating a panoramic image generates the panoramic image corresponding to the projection plane such that a length of a portion of the main line within the panoramic image corresponding to a unit amount of an angle of rotation around the observation point is maximized at a position closest to the attention direction.

8. A non-transitory, computer readable storage medium containing a computer program, which when executed by a computer, causes the computer to carry out actions, comprising:
generating a panoramic image that is obtained by converting, to a planar shape, a projection plane onto which a scene within at least a partial range of a virtual sphere as viewed from an observation point is projected, the panoramic image being such that a unit area on the virtual sphere containing a given attention direction as viewed from the observation point is converted to a broader area than other unit areas; and
outputting the generated panoramic image, wherein
the projection plane contains a main line that links a position in the attention direction to a position in a direction opposite the attention direction, and
the generating generates the panoramic image corresponding to the projection plane such that a length of a portion of the main line within the panoramic image corresponding to a unit amount of an angle of rotation around the observation point is maximized at a position closest to the attention direction.

* * * * *